United States Patent
Kocdemir et al.

(10) Patent No.: US 12,482,185 B2
(45) Date of Patent: Nov. 25, 2025

(54) DATA PROCESSING APPARATUS AND METHOD

(71) Applicant: Sony Interactive Entertainment Inc., Tokyo (JP)

(72) Inventors: Sahin Serdar Kocdemir, London (GB); Daniel Goldman, London (GB); Anthony William Dann, London (GB)

(73) Assignee: Sony Interactive Entertainment Inc., Tokyo (JP)

( * ) Notice: Subject to any disclaimer, the term of this patent is extended or adjusted under 35 U.S.C. 154(b) by 298 days.

(21) Appl. No.: 18/317,279

(22) Filed: May 15, 2023

(65) Prior Publication Data

US 2023/0377270 A1    Nov. 23, 2023

(30) Foreign Application Priority Data

May 18, 2022  (GB) ...................................... 2207266

(51) Int. Cl.
  *G06T 17/20*  (2006.01)
(52) U.S. Cl.
  CPC .......... *G06T 17/20* (2013.01); *G06T 2210/56* (2013.01)
(58) Field of Classification Search
  None
  See application file for complete search history.

(56) References Cited

U.S. PATENT DOCUMENTS

| | | | | |
|---|---|---|---|---|
| 2005/0093862 | A1* | 5/2005 | Boier-Martin | G06T 17/20 345/420 |
| 2007/0013694 | A1 | 1/2007 | Gold | |
| 2007/0188490 | A1* | 8/2007 | Kanal | G06T 7/187 345/423 |
| 2012/0229445 | A1* | 9/2012 | Jenkins | G06T 15/405 345/418 |
| 2017/0004627 | A1* | 1/2017 | Baloch | G06T 7/12 |

OTHER PUBLICATIONS

Extended European Search Report for corresponding EP Application No. 23171540.0, 9 pages, dated Oct. 13, 2023.

(Continued)

*Primary Examiner* — Sultana M Zalalee
(74) *Attorney, Agent, or Firm* — Fish & Richardson P.C.

(57) ABSTRACT

A data processing apparatus includes: an input unit configured to receive data corresponding to at least part of a mesh, where the at least part of the mesh includes a plurality of vertices, where each vertex corresponds to a location within a virtual space, and a plurality of polygons, where each polygon includes a perimeter comprising three or more lines, where each of the three or more lines intersects two of the plurality of vertices; a generating unit configured to, in a first phase, generate, based on the received data, two or more seed points, where each seed point corresponds to a location within the virtual space, and in a second phase, where the second phase is different from the first phase, generate two or more meshlets, where each meshlet includes a subset of the at least part of the mesh, where each meshlet is generated in dependence upon the location of a respective one of the generated seed points; and an output unit configured to output data corresponding to one or more of the generated meshlets.

22 Claims, 4 Drawing Sheets

(56) References Cited

OTHER PUBLICATIONS

Jiao Xue, "Mesh segmentation guided by seed points," Journal of Advanced Mechanical Design Systems and Manufacturing, vol. 9, No. 4, pp. 1-13, Jan. 1, 2015 (For relevancy see Non-Pat. Lit. #1).

Rashad, et al., "A Review on Mesh Segmentation Techniques," International Journal of Engineering and Innovative Technology, vol. 6, No. 8, pp. 18-26, Feb. 1, 2017 (For relevancy see Non-Pat. Lit. #1).

Christoph Kubusch, "Introduction to Turing Mesh Shaders" NVIDIA Developer Blog, https://devblogs.nvidia.com/introduction-turing-mesh-shaders/, 18 pages, Sep. 17, 2018 (For relevancy see Non-Pat. Lit. #1).

Combined Search and Examination Report for corresponding GB Application No. 2207266.4, 4 pages, dated Nov. 21, 2022.

* cited by examiner

DATA PROCESSING APPARATUS AND METHOD

BACKGROUND OF THE INVENTION

Field of Invention

The present invention relates to a data processing apparatus and method.

Description of the Prior Art

The geometry of a virtual object (or indeed a virtual environment) is often defined by a mesh. A mesh typically comprises a plurality of points and lines in a virtual space. The lines typically connect points together in such a manner so as to create a plurality of tessellating polygons (typically triangles) defining the geometry of the surface of the virtual object. Thus, each point in the mesh corresponds to a vertex of one or more of these tessellating polygons, and each line in the mesh corresponds to an edge of one or more of these tessellating polygons.

Meshes are typically used to generate images of virtual objects and/or environments from the point of view of a virtual camera located within the virtual space. In order to generate such images, graphics rendering processes such as texturing, shading, colouring, and the like are typically performed by CPU(s) and/or GPU(s) on the meshes of the virtual objects and/or environments, resulting in the virtual objects and/or environments taking on a more realistic/detailed appearance within the subsequently generated image. In order to increase the efficiency of graphics rendering, parts of a given mesh which are occluded from the point of view of the virtual camera are typically culled, that is, not input to the CPU(s) and/or GPU(s), and thus not taken into account during the performance of the remaining graphics rendering processes. This reduces the computational expense of generating an image of the virtual object and/or environment, as graphics rendering is only performed on those parts of the meshes which are visible from the point of view of the virtual camera, rather than being performed on the meshes in their entireties.

In order to facilitate the determination as to which parts of a given mesh should be culled before graphics rendering takes places, meshes are typically subdivided into meshlets, each meshlet being a subset of the mesh. When an image comprising the given mesh is to be generated, those meshlets (subsets of the given mesh) which are not visible from the given point of view of the virtual camera are culled, and those meshlets which are at least partially visible from the given point of view are taken into account during the graphics rendering.

Current meshlet generating (that is, mesh subdivision) strategies often produce meshlets which are computationally inefficient to render. As an example, a typical meshlet generating strategy is that of an "advancing front" iteration. This advancing front iteration strategy typically starts with a subset of one or more initial polygons located within a certain region of the mesh, each of these initial polygons typically adjoining at least one other initial polygon. In order to produce a meshlet, other polygons adjoining this subset are iteratively associated with the subset, each iteration typically associating one such adjoining polygon. Thus, the subset of polygons "grows" in a cumulative manner with each iteration. This iterative process is typically carried out until the number of polygons in the subset meets an upper limit threshold defining the number of vertices or polygons each meshlet should comprise at most, for example, 2, 5, 10, 20, 30, 50, or 100 vertices or polygons. This upper limit threshold may be imposed in order to balance the efficiency gains associated with culling the given meshlet (when it is occluded) with the computational expense of rendering the given meshlet (when it is at least partially in view).

From this first subset of polygons, a first meshlet is generated. Subsequently, one or more new subsets of initials polygons are created from the polygons which adjoin the first meshlet, and other polygons (not comprised within the first meshlet) are iteratively associated with these new subsets in the aforementioned cumulative manner. This process continues along the mesh until each polygon is comprised within one of the meshlets.

This strategy often produces meshlets which, despite comprising, say, the maximum number of polygons possible (taking into account the imposed upper limit thresholds), comprise a relatively higher number of the unique vertices, for example. Conversely, the generated meshlet may comprise the maximum number of vertices possible, but comprises a relatively lower number of the polygons, for example. As a non-limiting example, a meshlet generated in this way may have, say, 64 polygons but 100 unique vertices. Such a relatively higher number of vertices than that of polygons within a given meshlet increases the computational expense (and thus reduces the efficiency) of rendering the meshlet when it is (at least partially) in view of the virtual camera. This is because the coordinates of a given vertex within the meshlet, as well as the texture values, shading values, colour values or other rendering values that are associated with the given vertex are not being re-used to the maximum extent that they can be. Put alternatively, the coordinates, texture values, shading values, colour values and/or other rendering values associated with 100 unique vertices are being utilised to render a 64-polygon meshlet, instead of, say, only 64, for example.

The present invention seeks to alleviate or mitigate this issue.

SUMMARY OF THE INVENTION

In a first aspect, a data processing apparatus is provided in claim 1.

In another aspect, a data processing method is provided in claim 13.

Further respective aspects and features of the invention are defined in the appended claims.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

A data processing apparatus and method are disclosed. In the following description, a number of specific details are presented in order to provide a thorough understanding of the embodiments of the present invention. It will be apparent, however, to a person skilled in the art that these specific details need not be employed to practice the present invention. Conversely, specific details known to the person skilled in the art are omitted for the purposes of clarity where appropriate.

In an example embodiment of the present invention, an entertainment system is a non-limiting example of such a data processing apparatus.

Figure 1:
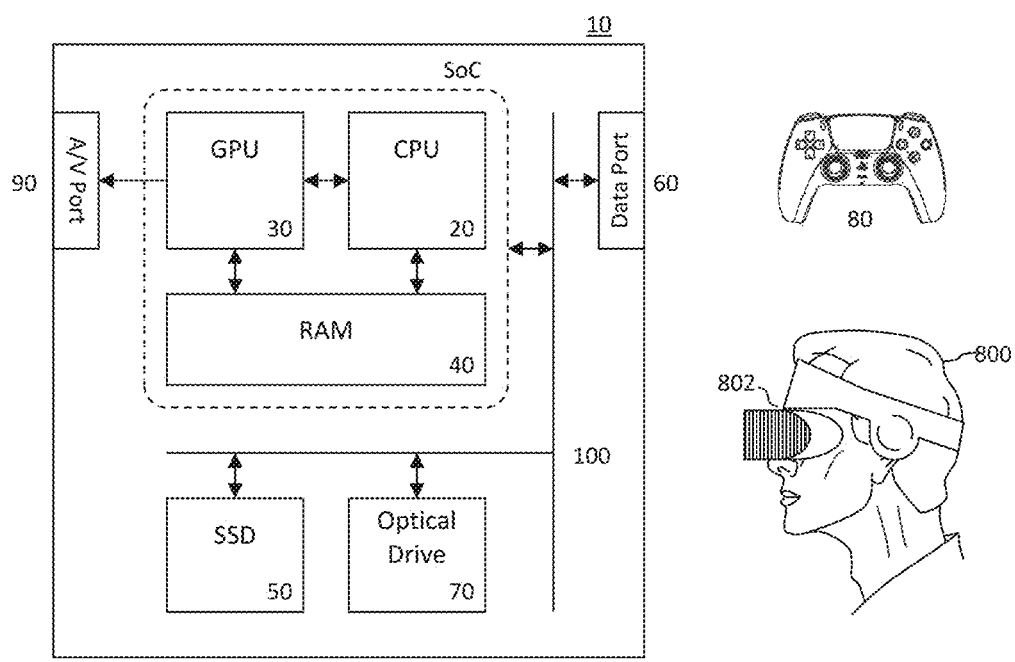
FIG. 1 schematically illustrates an entertainment system operable as a data processing apparatus according to embodiments of the present description.

Referring now to the drawings, wherein like reference numerals designate identical or corresponding parts throughout the several views, in FIG. 1 an example of an entertainment system 10 is a computer or console such as the Sony® PlayStation 5 ® (PS5).

The entertainment system 10 comprises a central processor 20. This may be a single or multi core processor, for example comprising eight cores as in the PS5. The entertainment system also comprises a graphical processing unit or GPU 30. The GPU can be physically separate to the CPU, or integrated with the CPU as a system on a chip (SoC) as in the PS5.

The entertainment device also comprises RAM 40, and may either have separate RAM for each of the CPU and GPU, or shared RAM as in the PS5. The or each RAM can be physically separate, or integrated as part of an SoC as in the PS5. Further storage is provided by a disk 50, either as an external or internal hard drive, or as an external solid state drive, or an internal solid state drive as in the PS5.

The entertainment device may transmit or receive data via one or more data ports 60, such as a USB port, Ethernet® port, WiFi® port, Bluetooth® port or similar, as appropriate. It may also optionally receive data via an optical drive 70.

Interaction with the system is typically provided using one or more handheld controllers 80, such as the DualSense® controller in the case of the PS5.

Audio/visual outputs from the entertainment device are typically provided through one or more A/V ports 90, or through one or more of the wired or wireless data ports 60.

Where components are not integrated, they may be connected as appropriate either by a dedicated data link or via a bus 100.

An example of a device for displaying images output by the entertainment system is a head mounted display 'I-IMD' 802, worn by a user 800.

Figure 2:
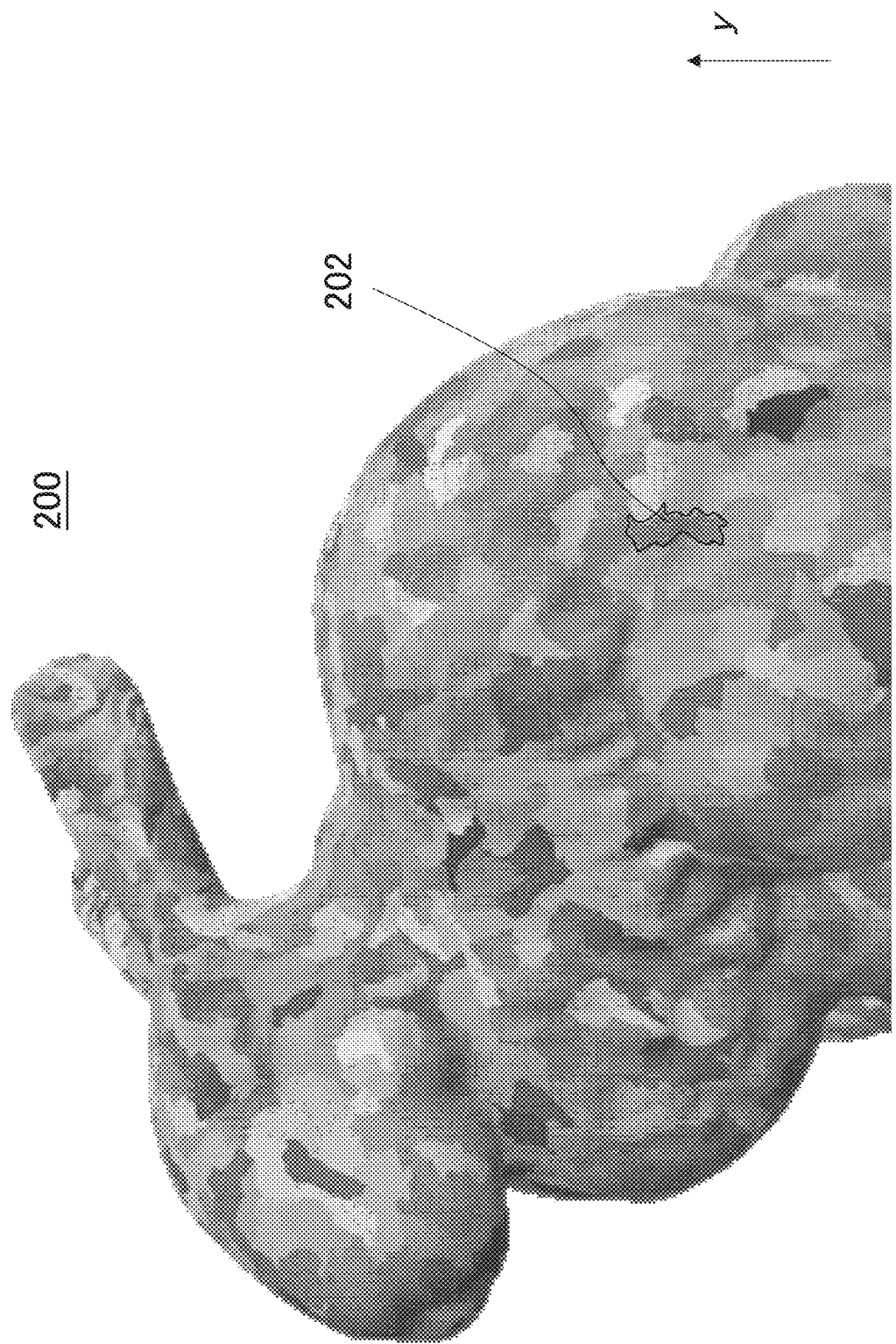
FIG. 2 illustrates a mesh of a virtual object which has been subdivided into a plurality of meshlets.

Turning now to FIG. 2, a part of mesh 200 of a virtual object (a virtual hare) is visible from a certain point of view of a virtual camera, this part of the mesh corresponding to the virtual hare's left side. Moreover, mesh 200 has been subdivided into a plurality of meshlets, one such meshlet being 202. As previously mentioned, the advantage of using meshlets when generating images of virtual objects is that those meshlets which are occluded from the point of view of the virtual camera may be culled before graphics rendering (such as texturing, shading, colouring, or the like) is carried out, which increases the efficiency of such graphics rendering. In the example of FIG. 2, those meshlets comprised within the right side of the virtual hare mesh would be culled before graphics rendering is carried out in order to efficiently generate images of the virtual hare from this point of view.

As previously mentioned, current meshlet generating strategies produce meshlets which are computationally inefficient to render, as the meshlets produced often comprise a larger number of unique vertices than polygons. For example, advancing front meshlet generation often starts in one specific region of the mesh (corresponding to the aforementioned subset of initial polygons) and progressively moves along ("sweeps" over) the mesh with each iteration. Because of this "sweeping", certain meshlets typically can only begin their respective iterative generation once other meshlets have been fully generated (that is, once the upper limit threshold for those other meshlets have been reached). This successive generation of meshlets typically causes the meshlets generated towards the end of the "sweep" to become relatively smaller than other meshlets in terms of polygon count, as the advancing front has no knowledge that the remaining, say, 50 polygons in the mesh can be utilised to generate the last meshlet, for example. Rather, the advancing front typically starts several new meshlets in this region, which results in, say, 3 meshlets comprising roughly 16 to 17 polygons each, for example. These small meshlets increase the computational expense associated with determining whether a given meshlet should be culled, as there is a greater number of meshlets to take into account.

Additionally, this "sweep" has a certain directionality which can influence the topology (and therefore the rendering efficiency) of the meshlets being generated. Typically, the advancing front strategies produce elongated meshlets, the elongation typically being orientated parallel to the direction of travel of the advancing front. For example, meshlet 202 of FIG. 2 can be considered as elongated. Moreover, the orientation of this elongated can provide an indication as to the direction in which the advancing front swept over the mesh. The elongation of meshlet 202 is oriented in the y direction. This suggests that the advancing front started from the bottom of the virtual hare mesh (that is, under one of the virtual hare's feet, or under its belly or tail) and swept over the virtual hare mesh towards the top of one of the virtual hare's ears, or vice versa. Elongated meshlets typically comprise a relatively higher number of unique vertices than polygons, which results in such meshlets being inefficient.

Figure 3:
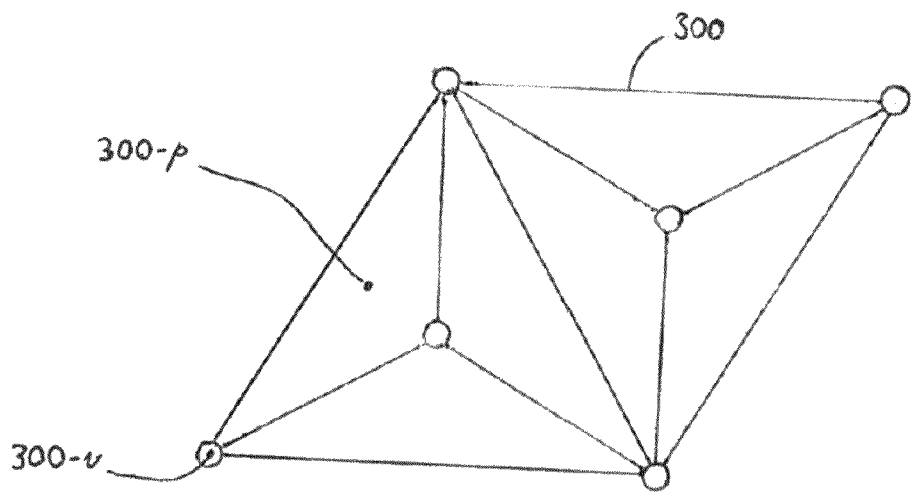
FIG. 3 schematically illustrates several non-limiting examples of meshlets of differing rendering efficiencies.
Figure 3:
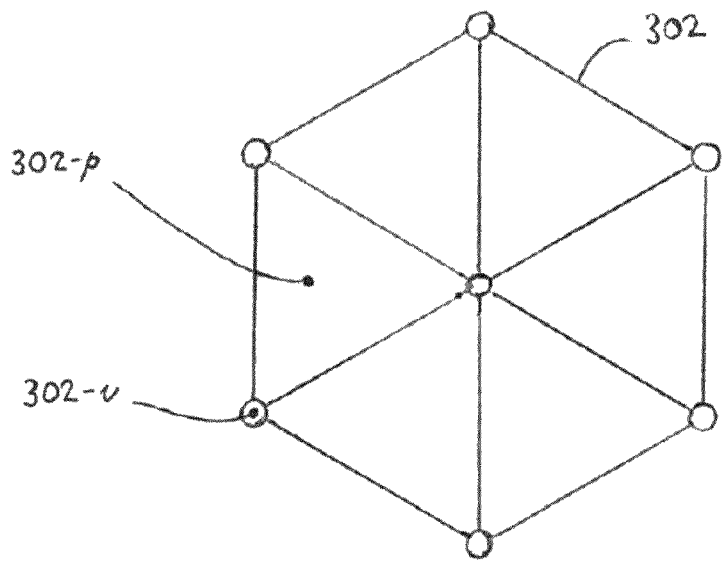
Figure 3:
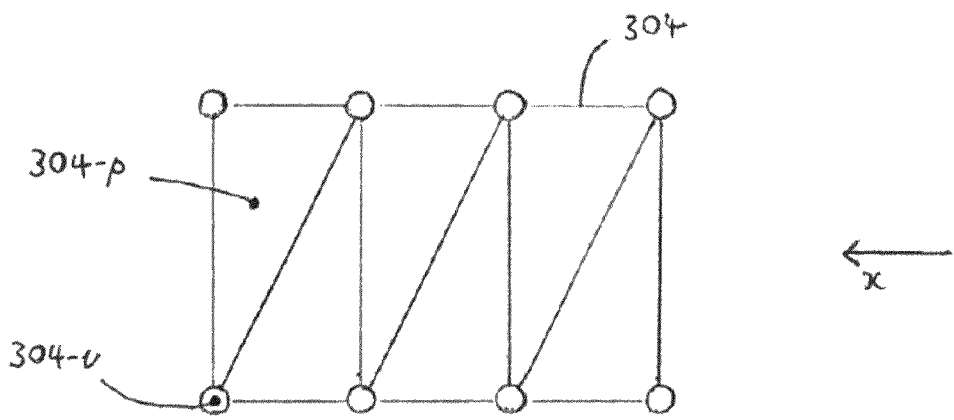

Turning now to FIG. 3, several non-limiting examples of meshlets of differing rendering efficiencies can be seen. Each meshlet 300, 302 and 304 comprises the same number of polygons, yet comprise a differing number of vertices. Meshlet 300 comprises 6 polygons (one such polygon being 300-p, for example) and 6 vertices (one such vertex being 300-v, for example). This meshlet can be considered the most efficient meshlet depicted within FIG. 3, as the number of unique vertices that enables the generation of a meshlet with 6 polygons has been minimised. This means that the minimum number of vertex coordinates, and texture, shading, colour, or other rendering values is required to render a 6-polygon meshlet, thereby minimising the computational expense of rendering a 6-polygon meshlet. Meshlet 302 comprises 6 polygons (one being 302-p) and 7 vertices (one being 302-v). This meshlet can be considered less efficient than meshlet 300 for rendering purposes, as the number of unique vertices that enables the generation of a meshlet with 6 polygons is greater than that of meshlet 304. Thus, a greater number of vertex coordinates, and texture, shading, colour, or other rendering values is required to render a 6-polygon meshlet. Meshlet 304 illustrates the effect of meshlet elongation on rendering efficiency. The elongated topology of meshlet 304 (the elongation being oriented in the x direction) means that it comprises 6 polygons (one being 304-*p*) and 8 vertices (one being 304-*v*). This can be considered the least efficient meshlet depicted within FIG. 3, as the number of unique vertices that enables the generation of a meshlet with 6 polygons has been maximised. Thus, the greatest number of vertex coordinates, and texture, shading, colour, or other rendering values is required to render a 6-polygon meshlet.

Therefore, as will be appreciated by persons skilled in the art, in embodiments of the present description, it is desirable to produce meshlets that are more computationally efficient than those which current meshlet generation strategies can produce.

Data Processing Apparatus

The aforementioned problem of reduced computational efficiency of generated meshlets can be mitigated or alleviated by implementing means to firstly determine the location of two or more seed points, and subsequently use each seed point as an initial point from which a respective meshlet can be generated. Such means allow for each meshlet to be generated independently of each other meshlet, rather than successively. This results in fewer elongated and/or low-polygon meshlets being generated, as each meshlet is generated in dependence upon its own seed point, rather than being dependent on the completion of a previous meshlet's generation.

Figure 4:
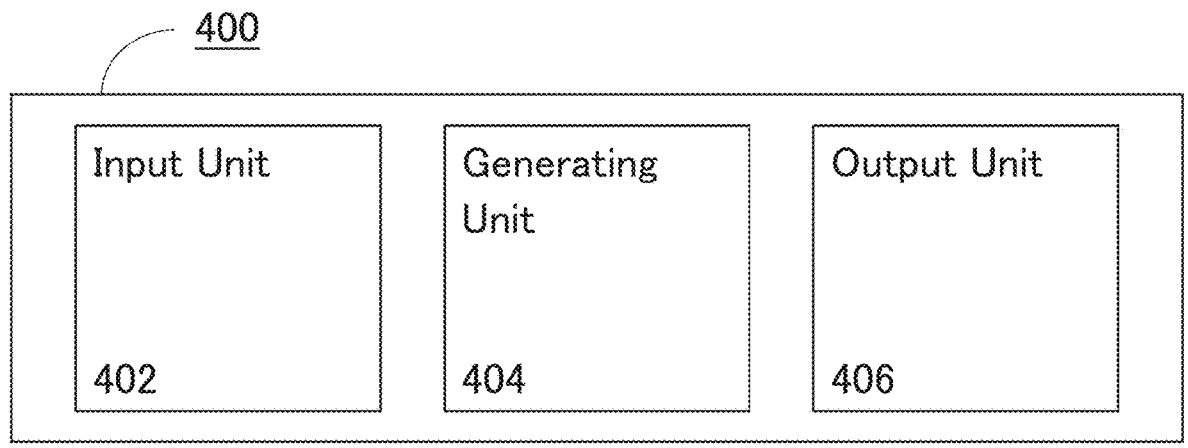
FIG. 4 schematically illustrates a data processing apparatus according to embodiments of the present description.

Accordingly, turning now to FIG. 4, in embodiments of the present description, data processing apparatus 400 comprises: input unit 402 configured to receive data corresponding to at least part of a mesh, wherein the at least part of the mesh comprises: a plurality of vertices, wherein each vertex corresponds to a location within a virtual space, and a plurality of polygons, wherein each polygon comprises a perimeter comprising three or more lines, wherein each of the three or more lines connects two of the plurality of vertices; generating unit 404 configured to: in a first phase, generate, based on the received data, two or more seed points, wherein each seed point corresponds to a location within the virtual space, and in a second phase, wherein the second phase is different from the first phase, generate two or more meshlets, wherein each meshlet comprises a subset of the at least part of the mesh, wherein each meshlet is generated in dependence upon the location of a respective one of the generated seed points; and output unit 406 configured to output data corresponding to one or more of the generated meshlets.

As previously mentioned, in embodiments of the present description, data processing apparatus 400 may be an entertainment device 10 such as a computer, a video game console, or the like. The input unit 404 may be an external data port 60, or I/O to bus 100, or a logical input unit within the CPU 20 and/or GPU 30 from a memory storing mesh data, or the like. The generating unit 404 may be the CPU 20 and/or GPU 30 operating under suitable software instruction, as may be the output unit 406.

Embodiments of the present description produce meshlets that are more computationally efficient than those which current meshlet generation strategies can produce. As a non-limiting example, consider a driving simulation video game. In such video games, it is typically desirable to generate high fidelity and/or high resolution renderings of the virtual car and/or the virtual environment through which the virtual car is driving. In order to perform such high fidelity and/or high resolution renderings efficiently, the mesh of the virtual car (or indeed a part of the virtual environment) may need to be subdivided into meshlets, these meshlets enabling the culling of those parts of the mesh which are occluded from the point of view of a virtual camera located within the virtual environment. As such, data corresponding to the mesh of the virtual car (or, alternatively, at least part of the virtual environment) may be input to data processing apparatus 400 via input unit 402. This mesh data may comprise, say, coordinates of each vertex of the mesh in a virtual space, and vertex connectivity data indicating which two vertices of the mesh are connected to form a given edge of a given polygon, for example. Based on this received mesh data, generating unit 404 may, in a first phase, generate, say, 500 seed points, for example, each seed point being a point within the virtual space. Generating unit 404 may subsequently, in a second phase, generate, for example, 500 meshlets, each meshlet being generated in dependence upon the location of a respective seed point. For example, a seed point located near the bonnet of the virtual car may be used by generating unit 404 during the second phase to generate a meshlet that comprises at least part of the virtual car's bonnet. Output unit 406 subsequently outputs data corresponding to at least one of the generated meshlets. For example, the outputted meshlet data may only comprise one meshlet. Alternatively, the outputted meshlet data may comprise several meshlets or indeed all meshlets. In such cases, the outputted meshlet data may comprise meshlet connectivity data indicating which meshlet(s) adjoin a given meshlet. In any case, the outputted meshlet data may be utilised in any subsequent graphics rendering processes in order to efficiently generate high fidelity and/or high resolution renderings of the virtual car and/or environment. It will be appreciated that the example of 500 seed points is entirely non-limiting; the number of seed points may depend for example on the number of polygons, and/or the image resolution, and/or depend or vary according to the number of meshlets culled for the preceding image frame, based on the assumption that the current frame is likely to be substantially similar in most cases. A further discussion of the number of seed points is provided elsewhere herein.

Therefore, embodiments of the present description produce meshlets that are more computationally efficient than those which current meshlet generation strategies can produce, as each of the generated seed points is being used as an initial point from which a respective meshlet can be generated, thereby enabling each meshlet to be generated independently of each other meshlet, and thus reducing the number of elongated and/or low-polygon meshlets being generated.

Mesh Data

In embodiments of the present description, input unit 402 may be one or more data ports 60, such as USB ports, Ethernet® ports, WiFi® ports, Bluetooth® ports, or one or more A/V ports 90, or internal memory I/O ports between ROM, RAM, and/or Graphics memory, and the CPU and/or GPU, or the like, as described elsewhere herein.

In embodiments of the present description, input unit 402 is configured to receive data corresponding to at least part of a mesh, wherein the at least part of the mesh comprises: a plurality of vertices, wherein each vertex corresponds to a location within a virtual space, and a plurality of polygons, wherein each polygon comprises a perimeter comprising three or more lines, wherein each of the three or more lines connects two of the plurality of vertices.

Data corresponding to at least part of the mesh may comprise a plurality of sets of coordinates, wherein each set of coordinates may define the location of a respective vertex within the virtual space (hereinafter referred to as "virtual space coordinates"), and connectivity data indicating which two of the plurality of vertices are connected by a given line. As will be appreciated by persons skilled in the art, the virtual space coordinates of a given vertex may be absolute (that is, coordinates defining the location of the given vertex relative to a predefined origin point within the virtual space) or relative (that is, coordinates defining the location of the given vertex relative to one or more other vertices). Moreover, the coordinate system employed may be Cartesian, cylindrical, spherical, or the like. Optionally, data corresponding to at least part of the mesh may comprise one or more rendering values, wherein each rendering value may be associated with one or more of the vertices. One or more of the rendering values may be used to generate one or more images of at least part of a surface of a virtual object and/or environment, wherein each rendering value may define a visual aspect of the at least part of the surface of the virtual object and/or environment. As will be appreciated by persons skilled in the art, a rendering value may be a value defining visual aspects such as, say, the texture, shading, colour, reflectivity, surface decoration, or the like, of at least part of the surface of the virtual object and/or environment. For example, the virtual car may have a particular colour scheme comprising multiple different colours (a racing livery, for example). Therefore, multiple colour values may be comprised within the data corresponding to the at least part of the mesh, each colour value being associated with different regions of the mesh (that is, one or more of the vertices of the mesh). These colour values may be used in subsequent graphics rendering processes to generate images of the virtual car in the racing livery.

Seed Points

In embodiments of the present description, it is desirable to firstly determine the number and/or the locations of meshlets to be generated from the received data before meshlet generation is carried out, as doing so enables each meshlet to be generated independently of each other meshlet, which in turn may result in meshlets that are more computationally efficient than those which current meshlet generation strategies can produce. As will be appreciated by persons skilled in the art, the number and/or locations of meshlets to be generated may depend on certain aspects of the given mesh comprised within the received data. For example, the mesh of the virtual hare may comprise a different number of vertices and/or polygons than the mesh of the virtual car. Moreover, the distribution of vertices and/or polygons may be different in the virtual hare mesh than the virtual car mesh, for example. For example, the virtual hare mesh may have a more even distribution of vertices and/or polygons throughout, whereas the virtual car mesh may have certain regions of high vertex and/or polygon density and certain regions of low vertex and/or polygon density. These differences may be due to differing levels of geometric complexity between different meshes, for example. For example, whereas the virtual hare mesh may define the smoothly curving and streamlined geometry typical of a hare, the virtual car mesh may define the geometry of certain features such as radiator grilles, manufacturer's badge/logo, air inlets, wing mirrors, door handles, wheel rims, tyre treads, or the like, each of which may require a large number of vertices and/or polygons in order that the geometry of the surfaces of these features may be modelled with a high fidelity. Thus, it would be desirable for data processing apparatus 400 to take these (and other) aspects of a given mesh (or indeed other aspects related to the received data) into account in order to determine the number and/or locations of meshlets to be generated from the given mesh before meshlet generation is carried out.

Therefore, in embodiments of the present description, generating unit 404 (which may be one or more CPUs 20 and/or one or more GPUs 30 as noted elsewhere herein) is configured to, in a first phase, generate, based on the received data, two or more seed points, wherein each seed point corresponds to a location within the virtual space.

A given seed point may be a point in the virtual space whose location is different from that of each vertex of the received data, for example. For example, the virtual space coordinates of the given seed point may be different from that of each vertex of the mesh. Optionally, the given seed point may be located along a given line of the received data. For example, the virtual space coordinates of the given seed point may be such that the seed point intersects a line that connects two of the vertices. As an alternative to lying along a line, the given seed point may be located within a given polygon of the received data. For example, the virtual space coordinates of the given seed point may be such that the seed point is located within the perimeter of a given polygon and lies within a plane intersecting the entire perimeter of the given polygon (this planar region hereinafter referred to as the "face of the polygon" or "facet"). Conversely, the given seed point may be located such that the seed point coincides with a given vertex of the received data. For example, the virtual space coordinates of the given seed point may be identical to that of a given vertex. In any case, each seed point may act as an initial point within the virtual space from which a respective meshlet may be generated. Generating meshlets based on seed points shall be discussed later herein.

Generating unit 404 may be configured to, in the first phase, generate one or more of the seed points in dependence upon the locations of one or more of the vertices. For example, generating unit 404 may generate, in dependence upon the virtual space coordinates of a given vertex, a given seed point at a location corresponding to that of the given vertex. As will be appreciated by persons skilled in the art, the location of the given seed point is not strictly limited to being coincident with that of the given vertex, but may include (either additionally or alternatively) the aforementioned types of seed point locations. All such types of seed point locations should be considered as implied throughout the description. As will be appreciated by persons skilled in the art, either the whole set of coordinates of the given vertex may be considered, or a subset thereof may be considered. For example, generating unit 404 may generate a given seed point at a location corresponding to that of a vertex that is the furthest away (with respect to at least one of the coordinate axes of the virtual space) from a predefined origin point within the virtual space. In the case of Cartesian coordinates, generating unit 404 may generate the given seed point at a location corresponding to that of a vertex whose virtual space coordinates comprise the largest abscissa value, the largest ordinate value, or the largest applicate value, or any combination thereof. As will be appreciated by persons skilled in the art, several such seed points may be generated, especially when positive and negative coordinate values are considered. In the case of Cartesian coordinates, generating unit 404 may generate, a first seed point at a location corresponding to that of a vertex with the largest positive abscissa value, a second seed point at a location corresponding to that of a vertex with the largest negative abscissa value, and so on, for example. Such seed points may be subsequently used to generate a meshlet in the outermost regions of the mesh (such as, in the case of the virtual car, a radio antenna protruding from the roof of the virtual car, for example). Alternatively or in addition, generating unit 404 may generate a given seed point at a location corresponding to that of a vertex that is the closest to (with respect to at least one of the coordinate axes of the virtual space) a predefined origin point within the virtual space, for example. Again, several such seed points may be generated by taking into account positive and negative coordinate values. Such seed points may be subsequently used to generate a meshlet in the innermost regions of the mesh (such as, in the case of the virtual car, the visible parts of the radiator behind the radiator grille, for example). In general, generating unit 404 may generate one or more of the seed points in dependence upon one or more vertices of which at least a subset of respective virtual space coordinates satisfy one or more conditions (relating to vertex location), for example. For example, a condition for generating a given seed point (other than that of maximal or minimal coordinate values) may be that, say, the ordinate value, y, of the vertex must lie in the range of 10 units ≤y≤15 units. In such case, generating unit 404 may generate the given seed point at a location corresponding to the averaged coordinate values of those one or more vertices which satisfy the ordinate value condition, for example. Such seed points (that is, those generated by using conditions) may serve to ensure that one or more meshlets can be independently generated within particular regions of the mesh.

As will be appreciated by persons skilled in the art, generating seed points in dependence upon the locations of vertices is not strictly limited to using the locations of vertices per se, but may include (either additionally or alternatively) using the locations of vertices to determine other mesh-related geometrical aspects. For example, as a given line connects two of the vertices of the mesh, the locations of those two connected vertices may be used to determine the length of the given line. Moreover, as a given polygon comprises at least three vertices, the locations of those at least three vertices may be used to determine the facet area of the given polygon, for example. Thus, generating unit 404 may generate a given seed point at a location corresponding to the longest or shortest line of the mesh (or a location corresponding to the largest or smallest facet of the mesh), for example. In the case of the longest line (or largest facet), such a seed point may be subsequently used to generate a meshlet in a region of the mesh comprising relatively larger polygons, such as a mesh region defining the geometry of a relatively large and/or flat part of the virtual object's surface, for example. In the case of the shortest line (or smallest facet), such a seed point may be subsequently used to generate a meshlet in a region of the mesh comprising relatively smaller polygons, such as a mesh region defining the geometry of a relatively small and/or curved part of the virtual object's surface, for example. In general, generating unit 404 may generate one or more of the seed points in dependence upon one or more lines (or facets) which satisfy one or more conditions (relating to line length or facet area), for example. In such case, generating unit 404 may generate the given seed point at a location corresponding to the averaged coordinate values of those one or more vertices which satisfy the one or more conditions, for example. As previously mentioned, such seed points (that is, those generated by using conditions) may serve to ensure that one or more meshlets can be independently generated within particular regions of the mesh. As will be appreciated by persons skilled in the art, the angle formed between two lines sharing a common vertex (and, by extension, the angle formed between two polygons sharing a common line) may be used (either as an alternative or in addition to using vertex locations per se, line lengths or facet areas) in any of the above-described ways as a means of generating one or more of the seed points.

Alternatively or in addition, in the event that the received data comprises one or more rendering values, generating unit 404 may be configured to, in the first phase, generate one or more of the seed points in dependence upon the locations of one or more vertices that are associated with one or more of the rendering values. As will be appreciated by persons skilled in the art, as a given rendering value (such as a colour value) may be associated with one or more vertices, the locations of those vertices may be used in any of the above-described ways as a means of generating one or more of the seed points. Such seed points may be subsequently used generate one or more meshlets in a region of the mesh comprising similar rendering values, which may result in a more efficient rendering of the meshlets, as, for a given meshlet, there may be fewer unique rendering values to take into account during rendering.

In embodiments of the present description, generating unit 404 may be configured to, in the first phase, generate each seed point in dependence upon an indication of a number of vertices and/or polygons that the meshlet generated in dependence upon the location of the seed point will comprise. That is to say, each seed point may be generated in dependence upon a prediction of the number of vertices and/or polygons that the respective subsequently generated meshlet will comprise. As will be appreciated by persons skilled in the art, the previous discussion regarding the generation of seed points comprises examples of such predictions/indications. For example, the number of vertices and/or polygons which satisfy a given condition (relating to vertex location, line length, facet area, angles between lines, angles between polygons, or the like) may be considered as a prediction/indication of the number of vertices and/or polygons a given meshlet (generated in dependence upon the location of the seed point) will comprise. This is because the seed point generated in dependence upon these condition-satisfying vertices and/or polygon may be located proximate to these vertices and/or polygons. For example, and as previously mentioned, the seed point may be generated at a location corresponding to the averaged coordinate values of the condition-satisfying vertices and/or polygons. This may result in the meshlet (generated in dependence upon the location of the seed point) comprising at least some of the condition-satisfying vertices and/or polygons. In another example, the number of vertices and/or polygons which are associated with a given rendering value may be considered as a prediction/indication of the number of vertices and/or polygons a given meshlet will comprise for the same reasons.

Alternatively or in addition, the indication may comprise information corresponding to a number of vertices and/or polygons located within a threshold distance from a given location within the virtual space. For example, for a given location within the virtual space (which may be the location of a vertex, a location intersecting a line, a location impinging upon a facet, or a location distinct from any of the preceding), there may be, say, 50 polygons located within, say, a 5 unit radius of the given location. This number of polygons may serve as a prediction/indication of the number of polygons that a meshlet generated in dependence upon a seed point whose location may correspond to the given location will comprise, for example. Alternatively or in addition, the indication may comprise information corresponding to a number of vertices and/or polygons which are visible from a virtual camera positioned at a given location and/or orientation within the virtual space. For example, for a given virtual camera location and orientation, there may be, say, 75 polygons which are visible from the given virtual camera location and orientation. This number of polygons may serve as a prediction/indication of the number of polygons that a meshlet generated in dependence upon, say, a seed point located at (or proximate to) the given virtual camera location and/or orientation will comprise.

As will be appreciated by persons skilled in the art, any of the above indications (and, indeed, any combination thereof) may ultimately serve to generate one or more meshlets with greater rendering efficiency within particular regions of the mesh, these particular regions being defined by the one or more conditions, the one or more rendering values, the threshold distance from the given location, and/or the given point of view of the virtual camera, for example. This is because the number of vertices and/or polygons that a given meshlet located within a particular region will comprise may be predicted before meshlet generation is carried out. Such a prediction may be used to determine the initial location of the given meshlet such that the given meshlet may subsequently comprise, say, the maximum number of vertices and/or polygons permitted (which may be defined by an upper limit threshold), for example. Alternatively or in addition, such a prediction may be used to determine the initial location of the given meshlet such that the given meshlet may subsequently comprise, say, a given number of polygons (which may or may not be the maximum number permitted), and the minimum number of unique vertices necessary to generate the given meshlet (comprising the given number of polygons, for example. That is to say, the prediction may be used to determine the initial location of the given meshlet such that the ratio of number of vertices to that of meshlet polygons comprised within the given meshlet has been minimised. Alternatively or in addition, such a prediction may be used to determine the initial location of the given meshlet such that the given meshlet may subsequently comprise, say, the maximum number of vertices and/or polygons associated with a given rendering value, thereby minimising the number of unique rendering values associated with the given meshlet. Alternatively or in addition, such a prediction may be used to determine the initial location of the given meshlet such that the given meshlet may subsequently comprise, say, the maximum number of vertices and/or polygons visible from a given point of view of a virtual camera, thereby minimising the amount of computational work being expended on parts of meshlets which are occluded from the given point of view (as such parts themselves have been minimised in terms or vertex and/or polygon count).

In any case, seed points are generated based on the received data, and these generated seed points are used to subsequently generate meshlets.

Meshlets

As previously mentioned, in embodiments of the present description, it is desirable to generate meshlets that are more computationally efficient than those which current meshlet generation strategies can produce. As will be appreciated by persons skilled in the art, the aforementioned seed points enable meshlets to be generated independently of each other, as each seed point may be used as an initial point from which a respective meshlet may be generated. As such, the generated seed points may be utilised by data processing apparatus 400 in order to generate meshlets with greater rendering efficiency.

Therefore, in embodiments of the present description, generating unit 404 (which, as mentioned previously, may be one or more CPUs 20 and/or one or more GPUs 30) is configured to, in a second phase, wherein the second phase is different from the first phase, generate two or more meshlets, wherein each meshlet comprises a subset of the at least part of the mesh, wherein each meshlet is generated in dependence upon the location of a respective one of the generated seed points.

As previously mentioned, meshlet generation may be considered as the subdivision of a given mesh into two or more subsets (or meshlets). In order to subdivide a given mesh (that is, generate meshlets), data processing apparatus 400 may determine which one or more vertices and/or polygons are to be comprised within which subset of the mesh (meshlet). As will be appreciated by persons skilled in the art, the seed points generated in the first phase may be used in the second phase in order to facilitate such a determination. For example, generating unit 404 may, in the second phase, associate one or more vertices and/or polygons with a given seed point. In doing so, generating unit 404 may determine which vertices and/or polygons are to be comprised within a given meshlet. For example, generating unit 404 may associate, say, 64 polygons with a given seed point. These 64 polygons can be considered as being the polygons which generating unit 404 has determined are to be comprised within a subset of the mesh (a meshlet). Subsequently, generating unit 404 may generate a meshlet (a subset of the mesh) comprising these 64 polygons (which are associated with the given seed point). As will be appreciated by persons skilled in the art, the association of vertices and/or polygons with a given seed point (and by extension, the subsequent generation of the given meshlet) may depend on the location of the given seed point.

As a non-limiting example, in embodiments of the present description, generating unit 404 may be configured to, in the second phase, associate a given vertex or polygon with a given seed point in dependence upon a distance between the given vertex or polygon and the given seed point, and generate each meshlet in dependence upon the vertices and/or polygons associated with a respective one of the seed points. For example, generating unit 404 may associate the given vertex or polygon with the nearest seed point, that is, the seed point whose location is closest to that of the given vertex or polygon. Alternatively or in addition, generating unit 404 may associate the given vertex or polygon with a given seed point in dependence upon the distance between the given vertex or polygon and the given seed point being less than or equal to a threshold distance, for example. As will be appreciated by persons skilled in the art, the location of a polygon may be a location corresponding to the centroid of the polygon's facet, for example. Optionally, the number of vertices and/or polygons associated with a given seed point may be dependent upon the location of the given seed point. For example, it may be advantageous to generate relatively inefficient meshlets (such as, for example, a meshlet comprising 64 polygons and 100 vertices) in regions of the mesh that are likely to be occluded for a high proportion of virtual camera points of view (and thus for relatively longer periods of time). Consider a mesh of a virtual vase. Such a virtual object may be relatively static within a virtual environment compared with, say, the virtual hare and/or virtual car meshes, which may move around the virtual environment, for example. As such, those surfaces of the virtual vase which make contact with a surface of another virtual object (or indeed of a virtual environment) may not be visible from any point of view of the virtual camera, as the contact between the surfaces may prevent a view of such contacting surfaces to be obtained. Therefore, meshlets within the region of those surfaces may be culled for the majority of (or even all) virtual camera points of view. Thus, it may be advantageous to associate a relatively high number of vertices to a seed point located proximate to such surfaces, and thereby generate a relatively inefficient meshlet in the region of those surfaces, as it may lead to a greater number of vertices being culled for relatively longer periods of time, resulting in a reduced number of vertex coordinates and rendering values being taken into account in graphics rendering processes occurring during such periods of time.

Generating unit 404 may be configured to, in the second phase, iteratively associate vertices and/or polygons with each seed point, wherein, for a given iteration, one or more vertices and/or polygons are associated with each seed point, and generate each meshlet in dependence upon the vertices and/or polygons associated with a respective one of the seed points. As will be appreciated by persons skilled in the art, the association that takes places within each iteration may depend upon the locations of the seed points. For example, the iterative association of vertices and/or polygons with seed points may be based on the distances therebetween (as discussed previously). Alternatively or in addition, generating unit 404 may be configured to, in the second phase, for the given iteration, associate a given vertex or polygon with a given seed point in dependence upon one or more of: a number of vertices and/or polygons currently associated with the given seed point; and a number of vertices and/or polygons that would be associated with the given seed point if the given vertex or polygon were to be associated with the given seed point. As will be appreciated by persons skilled in the art, the number of vertices and/or polygons that would be associated with the given seed point may be, say, the sum of the number of vertices and/or polygons currently associated with the given seed point and the number of vertices and/or polygons which are to be associated with the given seed point during the given iteration, for example. As a non-limiting example, there may be, say, 50 polygons and 55 vertices currently associated with a given seed point, and there may be, say, 1 vertex and 2 polygons which are to be associated with the given seed point. Summing the two sets of numbers would give 52 polygons and 56 vertices. Alternatively, the number of vertices and/or polygons that would be associated with the given seed point may be, say, just the number of vertices and/or polygons which are to be associated with the given seed point during the given iteration may only be considered. Generating unit 404 may utilise these numbers of vertices and/or polygons in order to determine how the to-be-associated vertex/polygon may affect the rendering efficiency of the resulting meshlet. As mentioned previously, the number of vertices in relation to that of polygons within a given meshlet affects the rendering efficiency of the given meshlet. Therefore, by utilising the current and/or potential numbers of meshlet vertices and/or polygons as a means to determine which vertex and/or polygon should be associated in a subsequent iteration, the rendering efficiency of the subsequently generated meshlet may be improved. As a non-limiting example, generating unit 404 may associate, for a given iteration, a particular vertex with a given seed point as in doing so, the generating unit 404 associates, say, 3 polygons with the given seed point, thereby reducing the number of unique vertices in the subsequently generated meshlet.

Alternatively or in addition, generating unit 404 may be configured to, in the second phase, for the given iteration, associate a given vertex or polygon with a given seed point in dependence upon information corresponding to whether the given vertex or polygon is visible from a location and/or orientation of the virtual camera from which one or more vertices or polygons currently associated with the given seed point are visible. Generating unit 404 may utilise such visibility information in order to determine how the to-be-associated vertex/polygon may affect the rendering efficiency of the resulting meshlet. As a non-limiting example, in the event that a given vertex or polygon is not visible from the given point of view (from which the vertices and/or polygons currently associated with a given seed point are visible), generating unit 404 may not associate the given vertex with the given seed point. By doing so, the amount of computational work being expended on parts of meshlets which are occluded from the given point of view may be minimised (as such parts themselves have been minimised in terms or vertex and/or polygon count).

Alternatively or in addition, generating unit 404 may be configured to, in the second phase, for the given iteration, associate a given vertex or polygon with a given seed point in dependence upon whether a number of vertices and/or polygons currently associated with the given seed point is less than a limiting threshold indicating a maximum number of vertices and/or polygons to be associated with the given seed point. As previously mentioned, this upper limit threshold may be imposed in order to balance the efficiency gains associated with culling the given meshlet (when it is occluded) with the computational expense of rendering the given meshlet (when it is at least partially in view).

In any case, the seed points generated in the first phase are used in the second phase in order to generate meshlets.

Meshlet Data

In embodiments of the present description, it is desirable to utilise the meshlets generated by generating unit 404 in subsequent graphics rendering processes in order to reduce the computational expense of graphics rendering.

Therefore, in embodiments of the present description, output unit 406 (which may be one or more data ports 60 and/or one or more A/V ports 90, or CPU 20 and/or GPU 30, and/or ROM, RAM, and/or graphic memory, as described elsewhere herein) is configured to output data corresponding to one or more of the generated meshlets.

Data corresponding to one or more of the generated meshlets may comprise a plurality of virtual space coordinates defining the locations of vertices within the virtual space, and connectivity data indicating which two of the plurality of vertices are connected by a given line. Optionally, data corresponding to one or more of the generated meshlets may comprise one or more rendering values, wherein each rendering value may be associated with one or more of the vertices. In any case, data corresponding to one or more of the generated meshlets may comprise subdivision data indicating which one or more vertices and/or polygons are comprised within a respective meshlet.

As will be appreciated by persons skilled in the art, the meshlet data may subsequently be used in graphics rendering processes in order to reduce the computational expense of graphics rendering.

Training the Generating Unit

As will be appreciated by persons skilled in the art, the location of a given seed point influences the rendering efficiency of the subsequently generated meshlet. In embodiments of the present description, it may be desirable to improve the generation of seed points in such a manner that their locations result in meshlets with higher rendering efficiency.

In embodiments of the present description, generating unit 404 may optionally comprise a generating model, wherein the generating model is trained to, in the first phase, generate one or more of the seed points. As will be appreciated by persons skilled in the art, the generating model may generate seed points according to any manner previously discussed (and any combination thereof). Alternatively or in addition, the generating model may learn to generate seed points by utilising training data corresponding to previously generated seed points and/or meshlets. Such training data may (or may not) have been generated by the generating model.

In embodiments of the present description, the generating model may be trained using a distance between each of one or more previously generated seed points and a centre point of a respective one of one or more previously generated meshlets, wherein each centre point corresponds to a location within the virtual space, wherein each centre point corresponds to a centroid of a respective one of the previously generated meshlets. As a non-limiting example, such training may serve to ensure that subsequently generated seed points are located such that the reliability of generating high efficiency meshlets (relative to current meshlet generation strategies) thereupon may be increased. Alternatively or in addition, the generating model may be trained using information corresponding to a number of vertices and/or polygons within each of one or more previously generated meshlets which are visible from a virtual camera positioned at a given location and/or orientation within the virtual space. As a non-limiting example, such training may serve to ensure that the subsequently generated seed points are located such that the meshlet generated in dependence thereupon comprises the minimum number of vertices and/or polygons which may be occluded from the given point of view. By doing so, the amount of computational work being expended on parts of meshlets which are occluded from the given point of view may be minimised. Alternatively or in addition, the generating model is trained using information corresponding to a data compression ratio of each of one or more previously generated meshlets. As a non-limiting example, such training may serve to ensure that subsequently generated seed points are located such that the meshlet generated in dependence thereupon may be more efficiently compressed. This may facilitate a more efficient transmission of the subsequently outputted meshlet data over, say, a network such as the Internet, LAN, or the like, as such meshlet data may have significantly reduced bandwidth requirements for such transmission, for example.

In any case, the generating model may be used to ultimately improve the efficiency of generated meshlets.

Data Processing Method

Figure 5:
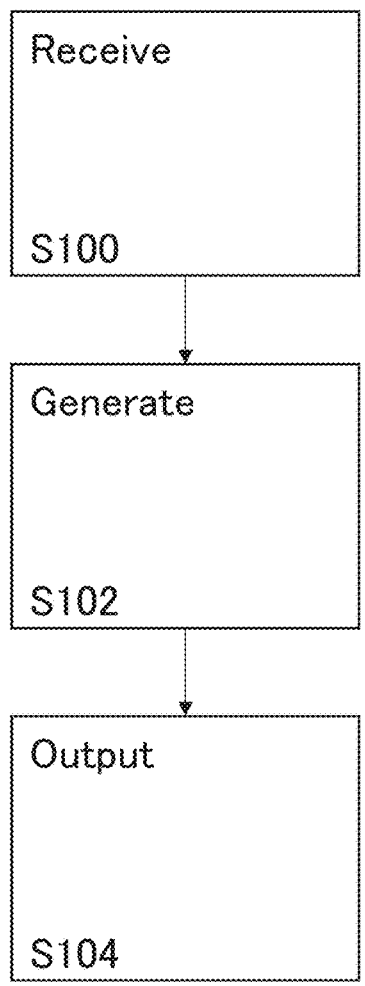
FIG. 5 schematically illustrates a data processing method according to embodiments of the present description.

Turning now to FIG. 5, a data processing method comprises the following steps: Step 100: receiving data corresponding to at least part of a mesh, wherein the at least part of the mesh comprises: a plurality of vertices, wherein each vertex corresponds to a location within a virtual space, and a plurality of polygons, wherein each polygon comprises a perimeter comprising three or more lines, wherein each of the three or more lines connects two of the plurality of vertices, as described elsewhere herein. Step 102: a generating step, comprising: in a first phase, generating, based on the received data, two or more seed points, wherein each seed point corresponds to a location within the virtual space, and in a second phase, wherein the second phase is different from the first phase, generating two or more meshlets, wherein each meshlet comprises a subset of the at least part of the mesh, wherein each meshlet is generated in dependence upon the location of a respective one of the generated seed points, as described elsewhere herein. Step 104: outputting data corresponding to one or more of the generated meshlets, as described elsewhere herein.

It will be apparent to a person skilled in the art that variations in the above method corresponding to operation of the various embodiments of the apparatus as described and claimed herein are considered within the scope of the present invention.

It will be appreciated that the above methods may be carried out on conventional hardware (such as entertainment device 10) suitably adapted as applicable by software instruction or by the inclusion or substitution of dedicated hardware.

Thus the required adaptation to existing parts of a conventional equivalent device may be implemented in the form of a computer program product comprising processor implementable instructions stored on a non-transitory machine-readable medium such as a floppy disk, optical disk, hard disk, solid state disk, PROM, RAM, flash memory or any combination of these or other storage media, or realised in hardware as an ASIC (application specific integrated circuit) or an FPGA (field programmable gate array) or other configurable circuit suitable to use in adapting the conventional equivalent device. Separately, such a computer program may be transmitted via data signals on a network such as an Ethernet, a wireless network, the Internet, or any combination of these or other networks.

The foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A system, comprising:
   one or more processors; and
   one or more tangible, non-transitory media operably connectable to the one or more processors and storing instructions that, when executed, cause the one or more processors to perform operations comprising:
   receiving data corresponding to at least part of a mesh, wherein the at least part of the mesh comprises:
   a plurality of vertices, wherein each vertex corresponds to a location within a virtual space, and
   a plurality of polygons, wherein each polygon comprises a perimeter comprising three or more lines, wherein each of the three or more lines connects two of the plurality of vertices;
   in a first phase, generating two or more seed points, including processing the received data with a generating model that is trained to generate seed points, wherein each seed point corresponds to a location within the virtual space, and
   in a second phase, wherein the second phase is different from the first phase, generating two or more meshlets, wherein each meshlet:
   comprises a subset of the at least part of the mesh, and
   is generated in dependence upon the location of a respective one of the generated seed points; and
   outputting data corresponding to one or more of the generated meshlets.

2. The system of claim 1, wherein the operations comprise, in the first phase, generating each seed point in dependence upon an indication of a number of vertices and/or polygons that the meshlet generated in dependence upon the location of the seed point will comprise.

3. The system of claim 2, wherein the indication comprises one or more of:
   i. information corresponding to a number of vertices and/or polygons located within a threshold distance from a given location within the virtual space; and
   ii. information corresponding to a number of vertices and/or polygons which are visible from a virtual camera positioned at a given location and/or orientation within the virtual space.

4. The system of claim 1, wherein the operations comprise, in the second phase:
   associating a given vertex or polygon with a given seed point in dependence upon a distance between the given vertex or polygon and the given seed point, and
   generating each meshlet in dependence upon the vertices and/or polygons associated with a respective one of the seed points.

5. The system of claim 1, wherein the operations comprise, in the second phase:
   iteratively associating vertices and/or polygons with each seed point, wherein, for a given iteration, one or more vertices and/or polygons are associated with each seed point, and
   generating each meshlet in dependence upon the vertices and/or polygons associated with a respective one of the seed points.

6. The system of claim 5, wherein the operations comprise, in the second phase, for the given iteration, associating a given vertex or polygon with a given seed point in dependence upon one or more of:
   i. a number of vertices and/or polygons currently associated with the given seed point; and
   ii. a number of vertices and/or polygons that would be associated with the given seed point if the given vertex or polygon were to be associated with the given seed point.

7. The system of claim 5, wherein the operations comprise, in the second phase, for the given iteration, associating a given vertex or polygon with a given seed point in dependence upon information corresponding to whether the given vertex or polygon is visible from a location and/or orientation of the virtual camera from which one or more vertices or polygons currently associated with the given seed point are visible.

8. The system of claim 5, wherein the operations comprise, in the second phase, for the given iteration, associating a given vertex or polygon with a given seed point in dependence upon whether a number of vertices and/or polygons currently associated with the given seed point is less than a limiting threshold indicating a maximum number of vertices and/or polygons to be associated with the given seed point.

9. The system of claim 1, wherein the generating model is trained using a distance between each of one or more previously generated seed points and a centre point of a respective one of one or more previously generated meshlets, wherein each centre point corresponds to a location within the virtual space, wherein each centre point corresponds to a centroid of a respective one of the previously generated meshlets.

10. The system of claim 1, wherein the generating model is trained using information corresponding to a number of vertices and/or polygons within each of one or more previously generated meshlets which are visible from a virtual camera positioned at a given location and/or orientation within the virtual space.

11. The system of claim 1, wherein the generating model is trained using information corresponding to a data compression ratio of each of one or more previously generated meshlets.

12. A data processing method, comprising:
   receiving data corresponding to at least part of a mesh, wherein the at least part of the mesh comprises:
      a plurality of vertices, wherein each vertex corresponds to a location within a virtual space, and
      a plurality of polygons, wherein each polygon comprises a perimeter comprising three or more lines, wherein each of the three or more lines connects two of the plurality of vertices;
   in a first phase, generating two or more seed points, including processing the received data with a generating model that is trained to generate seed points, wherein each seed point corresponds to a location within the virtual space, and
   in a second phase, wherein the second phase is different from the first phase, generating two or more meshlets, wherein each meshlet:
      comprises a subset of the at least part of the mesh, and
      is generated in dependence upon the location of a respective one of the generated seed points; and
   outputting data corresponding to one or more of the generated meshlets.

13. The data processing method to of claim 12, comprising generating each seed point in dependence upon an indication of a number of vertices that the meshlet generated in dependence upon the location of the seed point will comprise.

14. The data processing method of claim 13, wherein the indication comprises one or more of:
   i. information corresponding to a number of vertices and/or polygons located within a threshold distance from a given location within the virtual space; and
   ii. information corresponding to a number of vertices and/or polygons which are visible from a virtual camera positioned at a given location and/or orientation within the virtual space.

15. The data processing method of claim 12, comprising:
   associating a given vertex or polygon with a given seed point in dependence upon a distance between the given vertex or polygon and the given seed point, and
   generating each meshlet in dependence upon the vertices and/or polygons associated with a respective one of the seed points.

16. The data processing method of claim 12, comprising:
   iteratively associating vertices and/or polygons with each seed point, wherein, for a given iteration, one or more vertices and/or polygons are associated with each seed point, and
   generating each meshlet in dependence upon the vertices and/or polygons associated with a respective one of the seed points.

17. The data processing method of claim 16, comprising, for the given iteration, associating a given vertex or polygon with a given seed point in dependence upon one or more of:
   i. a number of vertices and/or polygons currently associated with the given seed point; and
   ii. a number of vertices and/or polygons that would be associated with the given seed point if the given vertex or polygon were to be associated with the given seed point.

18. The data processing method of claim 16, comprising, for the given iteration, associating a given vertex or polygon with a given seed point in dependence upon information corresponding to whether the given vertex or polygon is visible from a location and/or orientation of the virtual camera from which one or more vertices or polygons currently associated with the given seed point are visible.

19. The data processing method of claim 16, comprising, for the given iteration, associating a given vertex or polygon with a given seed point in dependence upon whether a number of vertices and/or polygons currently associated with the given seed point is less than a limiting threshold indicating a maximum number of vertices and/or polygons to be associated with the given seed point.

20. The data processing method of claim 12, wherein the generating model is trained using a distance between each of one or more previously generated seed points and a centre point of a respective one of one or more previously generated meshlets, wherein each centre point corresponds to a location within the virtual space, wherein each centre point corresponds to a centroid of a respective one of the previously generated meshlet.

21. The data processing method of claim 12, wherein the generating model is trained using information corresponding to one or more of:
   i. a number of vertices and/or polygons within each of one or more previously generated meshlets which are visible from a virtual camera positioned at a given location and/or orientation within the virtual space; and
   ii. a data compression ratio of each of one or more previously generated meshlets.

22. A non-transitory, computer-readable storage medium containing a computer program comprising computer executable instructions adapted to cause a computer system to perform operations comprising:
   receiving data corresponding to at least part of a mesh, wherein the at least part of the mesh comprises:
      a plurality of vertices, wherein each vertex corresponds to a location within a virtual space, and
      a plurality of polygons, wherein each polygon comprises a perimeter comprising three or more lines, wherein each of the three or more lines connects two of the plurality of vertices;
   in a first phase, generating two or more seed points, including processing the received data with a generating model that is trained to generate seed points, wherein each seed point corresponds to a location within the virtual space, and
   in a second phase, wherein the second phase is different from the first phase, generating two or more meshlets, wherein each meshlet:
      comprises a subset of the at least part of the mesh, and
      is generated in dependence upon the location of a respective one of the generated seed points; and
   outputting data corresponding to one or more of the generated meshlets.

\* \* \* \* \*